United States Patent
Cuccia et al.

[11] Patent Number: 6,151,676
[45] Date of Patent: Nov. 21, 2000

[54] ADMINISTRATION AND UTILIZATION OF SECRET FRESH RANDOM NUMBERS IN A NETWORKED ENVIRONMENT

[75] Inventors: David Cuccia, Annapolis, Md.; Michael A. Epstein, Spring Valley; Michael S. Pasieka, Thornwood, both of N.Y.

[73] Assignee: Philips Electronics North America Corporation, New York, N.Y.

[21] Appl. No.: 08/989,875

[22] Filed: Dec. 24, 1997

[51] Int. Cl.$^7$ .................................................... H04L 9/00
[52] U.S. Cl. ........................... 713/176; 713/168; 713/200; 713/170; 713/171; 713/178; 380/268; 380/259; 380/278; 380/281; 380/283; 380/46
[58] Field of Search ................................. 380/30, 43, 44, 380/47, 268, 259, 262, 278, 281, 282, 283, 46; 705/67, 72, 76; 713/156, 168, 170, 171, 176, 178, 200

[56] References Cited

U.S. PATENT DOCUMENTS

| | | | |
|---|---|---|---|
| 4,956,863 | 9/1990 | Goss | 380/30 |
| 5,136,646 | 8/1992 | Haber et al. | 380/49 |
| 5,148,479 | 9/1992 | Bird et al. | 380/23 |
| 5,406,628 | 4/1995 | Beller et al. | 380/30 |
| 5,434,918 | 7/1995 | Kung et al. | 380/25 |
| 5,475,763 | 12/1995 | Kaufman et al. | 380/30 |
| 5,481,720 | 1/1996 | Loucks et al. | 395/700 |
| 5,590,199 | 12/1996 | Krajewski, Jr. et al. | 380/25 |
| 5,608,801 | 3/1997 | Aiello et al. | 380/46 |
| 5,638,448 | 6/1997 | Nguyen | 380/29 |
| 5,719,940 | 2/1998 | Ahn et al. | 380/25 |
| 5,778,065 | 7/1998 | Hauser et al. | 380/21 |

OTHER PUBLICATIONS

"Applied Cryptography", 2nd Ed., Bruce Schneier: Aut., John Wiley & Sons, Oct. 18, 1995 pp. 32–56.

*Primary Examiner*—Tod R. Swann
*Assistant Examiner*—Paul Callahan
*Attorney, Agent, or Firm*—Daniel J. Piotrowski

[57] ABSTRACT

In a public key cryptosystem employing the El-Gamal algorithm, secret fresh random numbers are generated at a server and private keys of users, as encrypted with a symmetric algorithm by using individual user identifying keys determined by hashing the users' respective passphrases or biometric information (fingerprint, voiceprint, retina scan, or face scan) are maintained in a store accessible to the server, and the fresh random numbers and encrypted private keys are transmitted to the user equipment when needed via a network which is not secure. In order to prevent an attacker from discovering the random numbers or employing formerly used random numbers in a block replay attack, an interchange in the nature of a challenge response protocol is employed which passes at least one secret fresh random number from the server to the user equipment while also authenticating the user to the server. In this interchange, a first random number to be distributed to the user for use in signing a document and a second random number which is to be used by the user in forming a signature of a hashing together of the first and second random numbers as part of the challenge response protocol, are supplied to the user equipment in encrypted form together with a freshness value, and a signature by the server of a hashing together of the first and second random numbers and the freshness value.

20 Claims, 2 Drawing Sheets

ADMINISTRATION AND UTILIZATION OF SECRET FRESH RANDOM NUMBERS IN A NETWORKED ENVIRONMENT

RELATED APPLICATION

This application is related in subject matter to an application by one of the inventors herein filed on Dec. 19, 1997, entitled "Administration and Utilization of Private Keys in a Networked Environment".

BACKGROUND OF THE INVENTION

1. Field of the Invention

The present invention relates to methods and systems for administration and utilization of secret fresh random numbers in a networked environment, for example, for digital signature or encryption operations employing the El-Gamal algorithm.

2. Description of the Related Art

Random numbers which are secret and have not been previously used, termed herein "secret fresh random numbers" are utilized in a variety of cryptosystems. One such use is for performing either a digital signature or an encryption in a public key cryptosystem employing the El-Gamal algorithm. In public key cryptosystems a pair of a corresponding public key and a private key may be assigned for each user or client.

The need for secret fresh random numbers when the El-Gamal algorithm is employed for either digital signing or encrypting, is due to its two main weaknesses: 1) none of the random numbers can ever be known by an attacker; and 2) use of the same random number to sign or encrypt two different documents is prohibited. Failure in either case allows an attacker enough information to recover a private key used for a digital signature, or to recover items which have been encrypted using a public key. The recovery of a particular private key by an eavesdropper is considered a catastrophic failure of the system and the recovery of messages sent encrypted with a particular public key may be considered a catastrophic failure depending on the nature of the messages.

A digital signature employing the El-Gamal algorithm utilizes the private key of the signer, a secret fresh random number, and generally the result of applying a secure hash function (such as SHA-1 or RIPEMD) to one or more data items, such as documents, files, programs, or keys (which for simplicity are referred to hereinafter as "documents") to manifest the signer's origination, approval, or certification thereof. The documents to which the signature applies are typically sent along with the signature unless they are already extant at or available to the recipient. At the receiving end a verification takes place which includes utilization of the originator's public key, which has been obtained by the recipient with a certificate from a trustworthy source, and application of the hash function to the documents which are received or otherwise available.

An encryption of data employing the El-Gamal algorithm for the purpose of transmission to a recipient generally involves using the public key of the recipient, which has been obtained with a certificate from a trustworthy source, and a secret fresh random number. The data so encrypted may comprise a symmetric key for one time use which has been used to encrypt in a computationally efficient manner an associated item employing a symmetric encryption algorithm, the encrypted symmetric key and the associated item constituting a package. At the receiving end, the encrypted data or package is decrypted by operations including a decryption using the private key of the recipient. In the case of a package, the decryption using the private key yields the symmetric key which is then used to decrypt the associated item in a computationally efficient manner.

The need for secret fresh random numbers to be available at the user equipment, generally requires the expense of equipping all user equipment with a random number generator based on a natural random phenomenon, such as a reverse biased zener diode exhibiting shot noise in its current. This expense could be avoided if secret fresh random numbers were generated at the server and supplied to the user equipment via the network in a secure manner when needed. However, even if an encrypted channel were set up between the server and the user through an exchange of public keys, and a certificate system were in place to certify the public keys, thereby preventing a man-in-the-middle attack, the freshness requirement would still make the system vulnerable to a block replay attack, in which previous encrypted transmissions, or portions thereof, are replayed by an attacker.

In the aforementioned related patent application, it has been proposed that the private keys of users be maintained at the server in encrypted form, encrypted using user identifying keys, and supplied to the user or client equipment via the network only when needed, for example, for performing a digital signature or encryption. The user identifying keys are derived from user identifying information which is assumed to require the actual presence of the user at the user equipment, in particular a hash of a passphrase entered by the user or biometric information (fingerprint, voiceprint, retina scan, or face scan) measured or scanned by interaction with a physically present user.

In the prior art, also challenge response protocols are known for enabling a server to authenticate a client or user, i.e. to verify that the user possesses his private key, before showing the user any private information. Typically, a challenge response protocol consists of the server generating a random number and sending it in the clear via a network to the user, and the user responding by signing the random number using his private key and sending this signature back to the server. The server can verify the signature (and ensure that it was for the same random number that was sent) using the user's private key and the random number. However, if the El-Gamal algorithm were employed for the signature, there would have to be a random number generator at the user equipment to provide another random number to be used for the signature along with the user's private key. The random number to be signed could not also be used as the random number needed for an El-Gamal signature because of lack of assurance to the user equipment that this random number is both secret and fresh.

SUMMARY OF THE INVENTION

It is an object of the present invention to provide a method of administering and using secret fresh random numbers in which such random numbers are generated at the server and supplied to the user equipment in a secure manner when needed, for example, for digital signatures or encryptions employing the El-Gamal algorithm.

It is a further object of the present invention that one or more secret fresh random numbers are passed from the server to the user equipment in a manner which not only assures that the random numbers passed are secret and fresh, but also serves to authenticate the user to the server in the nature of a challenge response protocol.

It is another object of the present invention to provide such a random number administration and utilization method in conjunction with a method for administering and using private keys in which private keys of users are not retained on user equipment, but rather are retained in memory means accessible to the server and are transmitted to the user equipment in encrypted form via the network when needed, for example, for such digital signatures or encryptions employing the El-Gamal algorithm.

It is still another object of the present invention to provide a method of and system for administering secret fresh random numbers and private keys of users in a centralized manner and for distributing such random numbers and keys to user equipment in a manner which is highly secure from extraction and from block replay attack.

Briefly, these and other objects are satisfied by methods and systems in which there is associated with each user a respective set of a private key, public key corresponding to the private key, ID, and preferably a unique user identifying key which is obtainable only through interaction with a user that is physically present at the user equipment.

From the point of view of the server, the present invention is directed to a method of administration of secret fresh random numbers for use by users in a networked environment to which a server is coupled, said method both assuring that the random numbers are secret and fresh and also being in the nature of a challenge response protocol in which: a user's ID is received via the network; at least a first random number is generated and encrypted using the public key of the user; a freshness value corresponding to a current date/time is formed; items are hashed including the first random number and the freshness value to form a first hash; a first signature of the first hash is formed using the private key of the server; a package including an encrypted component containing at least the first random number, freshness value, and first signature is sent to the user via the network; and subsequently there is received a second signature of data derived from at least the first random number, said second signature being formed using the private key of the user; and using the public key of the user, it is first verified whether the second signature is for the same first random number as was sent by the server. As an alternative embodiment of the invention, at least first, second, third, and fourth random numbers are generated and utilized in constructing the package. Specifically, in forming the package at the server, at least the first and second random numbers are contained in the encrypted component which is formed using the public key of the user and the third random number; the first hash is formed by hashing together the first and at least another of the random numbers contained in the package (including possibly the second random number) and the freshness value; the first signature of the first hash is formed using the private key of the server and the fourth random number. In regard to the subsequently received second signature of data, the data comprises a second hash which has been formed at the user equipment by hashing together the first and at least another of the random numbers contained in the package (including possibly the second random number), and the signature thereof has been formed using the private key of the user and the second random number. Then, the first verifying step is whether the second signature is for same random numbers as were sent by the server. This leaves the user equipment with at least the first random number which is fresh, secret, and consequently usable for a subsequent signature or encryption operation, while also enabling the server to authenticate the user by the fact that the user was able to sign the first and at least another random number included in the package using his private key and the second random number.

As in the aforementioned related application, the method from the point of view of the server also involves reading from a storage means data corresponding to the user having the received ID, which data comprises the user's private key encrypted using a key determined from identifying information of the user. This encrypted private key of the user read from the storage means is included in the aforementioned package sent to the user. The user identifying information comprises a passphrase entered by the user at the user equipment, or biometric information which is obtained from the user by suitable measurement or scanning at the user equipment.

From the point of view of the user equipment, the present invention is directed to a method for obtaining and using secret fresh random numbers at user equipment in a networked environment to which a server is coupled, in which: an ID of a user is transmitted; a package is received including an encrypted component containing at least a first random number, which has been formed using the public key of the user, a freshness value corresponding to a date/time, and a first signature of a first hash, said first hash having been formed by hashing together items including said first random number and the freshness value, and said first signature having been formed using the private key of the server; at least the first random number is decrypted the using the private key of the user; it is determined whether the current date/time is no more than a predetermined amount later than the freshness value; the first hash is independently computed; the first signature is verified using the public key of the server and the independently computed first hash; and if the results of the determining and verifying are positive, a second signature of data derived from at least the first random number is formed using the private key of the user, and is sent to the server via the network.

As previously mentioned the received package actually has been constructed using at least first, second, third, and fourth random numbers, of which the encrypted component which has been formed using the public key of the user and the third random number contains at least the first and second random numbers, the first hash has been formed by hashing together said first random number, at least another of the random numbers included in the package (including possibly the second random number), and said freshness value, and the first signature thereof has been formed using the private key of the server and the fourth random number. Consequently, at the user equipment, the at least first and second random numbers are decrypted using the private key of the user, the data is formed by hashing together the decrypted at least first and random number and another of the random numbers contained in the package (including possibly the second random number) to form a second hash, and the second signature thereof is formed using the private key of the user and the second random number.

Further, the method from the point of view of the server involves that the received package further includes the private key of the user encrypted with a user identifying key associated with the user, and that the encrypted private key is decrypted using a user identifying key determined from interaction with the user at the user equipment. The user identifying key determined by interaction with the user at the user equipment is determined from a passphrase entered by the user at the user equipment or biometric information which is obtained from the user by suitable measurement or scanning at the user equipment.

The present invention is also directed to a server system for supplying items for a plurality of users for use in signature or encryption operations employing the El-Gamal algorithm, which system comprises a random number generator for generating at least first, second, third, and fourth random numbers, and means for forming a package including: at least the first and second random numbers encrypted together using the public key of a user and the third random number; a freshness value; and a first signature of a first hash formed by hashing together said first and second random numbers and said freshness value, said first signature being formed using the private key of the server and the fourth random number. The server system is also characterized in that it further comprises verification means for verifying received second and third signatures, the second signature being of a second hash which has been formed by hashing together the first and at least another random number contained in the package, and having been made using the private key of the user and the second random number, and the third signature being of a hash of a document, and having been made using the private key of the user and the first random number. Also, the server system comprises computer readable storage means characterized in that there is stored therein encrypted private keys for the respective users which private keys have been encrypted using respective keys determined from respective user identifying information (e.g. a passphrase or biometric information), and wherein the package further includes the encrypted private key of the user.

Other objects, features and advantages of the present invention will become apparent upon perusal of the following detailed description when taken in conjunction with the appended drawing, wherein:

DETAILED DESCRIPTION OF THE PREFERRED EMBODIMENTS

It should be understood that while the present invention is discussed hereinafter in terms of an exemplary system and method for obtaining digitally signed documents of a plurality of users in a networked environment which have been signed employing the El-Gamal algorithm, the principles of the present invention are equally applicable to distribution of secret fresh random numbers, and/or to distribution of a combination of a secret fresh random number and an encrypted private key, for other purpose. Further, when used for digital signatures, it should be appreciated that such signatures may be applied to a variety of data, files, programs or other "documents", whether originated, modified or reviewed by users. In any event, the digital signature may be thought of as manifesting an approval by the user of a document.

One aspect of the present invention is that it employs user identifying keys Kpass for each user, for securing private keys KprUser. The user identifying keys Kpass can only be derived from user identifying information obtained by interaction with the user physically present at the user equipment. The user identifying information may be either a fanciful series of words, termed a passphrase, entered by a user or biometric information, such as a fingerprint, voiceprint, retina scan or face scan, obtained by measurement or scanning of the user.

It is very difficult to guess passphrases as opposed to passwords as there are many possible phrases. For example, a particularly good passphrase may concatenate two phrases which are in different languages. Guessing such a passphrase would be extremely difficult using normally available computer power. Also, biometric information is particularly unique and immune to a guessing attack.

Figure 1:
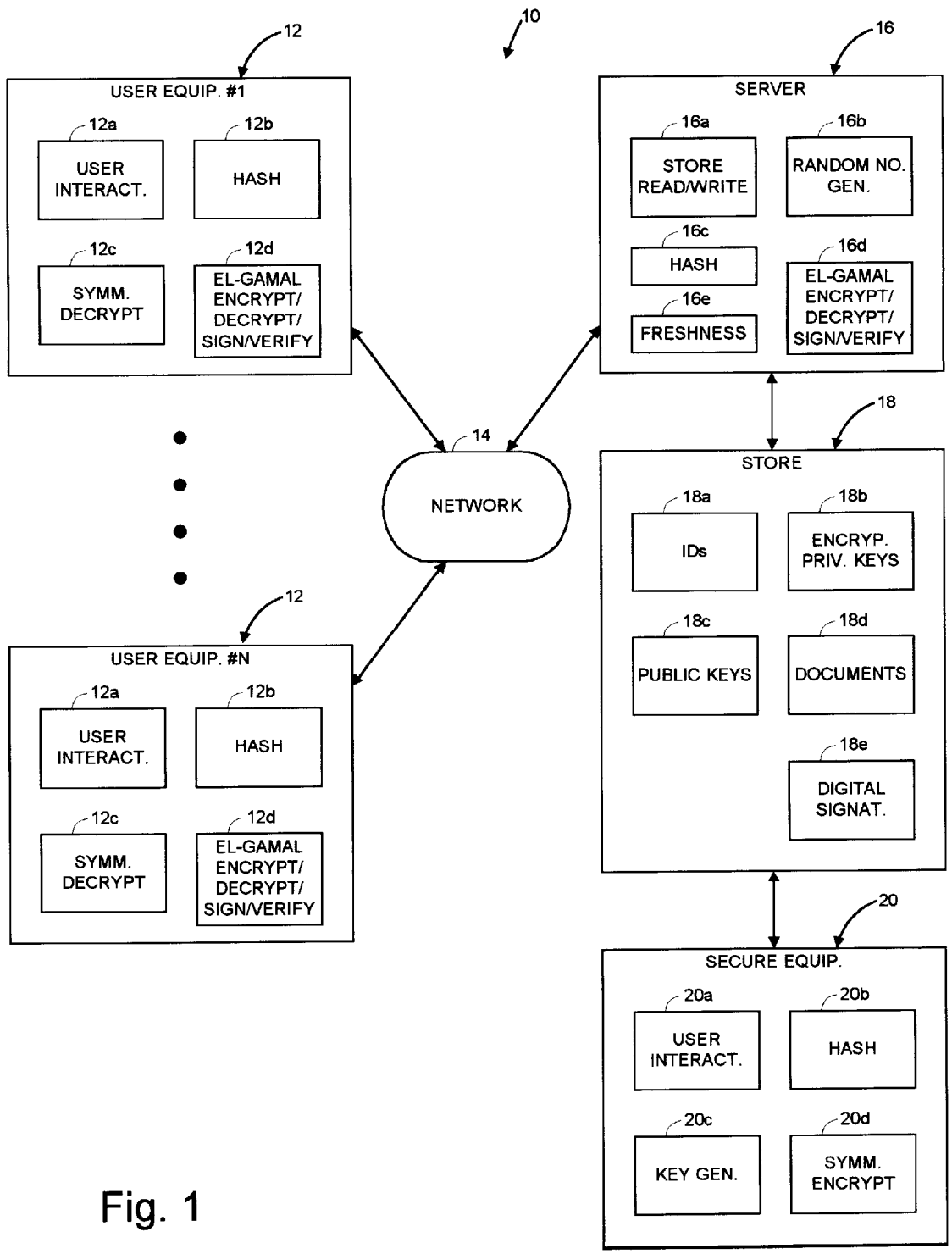
FIG. 1 is a schematic diagram of an exemplary system in accordance with the present invention for administering random numbers and private keys for a plurality of users used for digitally signing documents employing the El-Gamal algorithm, which system includes user equipment and a server.

Referring first to FIG. 1 of the drawing, there is shown a networked system 10 comprised of a plurality of computer stations, terminals or other user computing and/or communication equipment 12 and a server 16 interconnected or capable of communicating via a wired or wireless network 14. A store 18, which may be or include RAM, ROM, a hard disk, or other memory or media, is coupled to or forms part of server 16, and contains respective sections 18a–e, or fields in a data structure, for storing user IDs, encrypted private keys, public keys, documents, and digital signatures, respectively, for all users, which are indexed or otherwise addressable or retrievable by ID. Networked system 10 may take a variety of forms but is preferably an intranet, the network 14 supporting TCP/IP, the user equipment 12 employing web browsers, and the server 16 acting as a web server.

The public/private key pair for each user is implemented pursuant to the well known El-Gamal algorithm or public key cryptosystem, whereas the encrypted private keys stored in section or field 18b of the store 18 have been encrypted with a symmetric encryption/decryption algorithm (employing the same key for encryption and decryption) such as IDEA or DES using a user identifying key derived from the user's passphrase or biometric information.

In accordance with the El-Gamal algorithm, the public key actually consists of three components, Y, G and P, and the private key consists of a random number X, where P is a prime number, G is a random number, and $Y=G^X \bmod P$. For the purposes of the present invention, preferably prime number P has a length of 1024 bits, and all random numbers generated for use in signature or decryption using the El-Gamal algorithm (R1, R2, R3, R4 referred to hereinafter) have a length of 128 bits. It is a further requirement of the El-Gamal algorithm that these generated random numbers be invertible in the finite field of numbers described by the length of P, i.e 1024 bits.

In order to construct the dataset of encrypted private keys E[Kpass](KprUser), the user identifying keys Kpass have previously been obtained in an extremely secure way as a result of the presence of the respective users at secure equipment 20 coupled to store 18 or server 16. Secure equipment 20 comprises a user interaction means 20a and a hashing means 20b of the same form as the user interaction means 12a and hashing means 12b, respectively, of user equipment 12 (which will be described hereinafter), a key generator 20c for generating public key/private key pairs KpuUser/KprUser, and an encryption means for encrypting a generated private key KprUser with a user identifying key Kpass using a symmetric encryption algorithm such as IDEA or DES.

At the secure equipment 20, using the user interaction means 20a each passphrase was entered by the respective user or biometric information obtained by measuring or scanning the respective user in front of the system administrator (to confirm the user's identity) when the user was assigned a private key KprUser and a corresponding public key KpuUser generated by key generator 20c, but any passphrase entered or biometric information obtained was not viewed by or accessible to the administrator. The entered passphrase or obtained biometric information was then immediately hashed by hashing means 20b with a secure hash function (SHA-1 or RIPEMD) to form a fixed length user identifying key Kpass, of at least 128 bits in length (160 bits if SHA-1 is used), which was immediately used by encryption means 20c to encrypt the assigned private key KprUser with the symmetric algorithm, after which all traces of the entered passphrase or obtained biometric information, and the hash thereof were cleaned from the secure equipment 20. Further, IDs are assigned at the same time as the thereby encrypted private keys E[Kpass](KprUser), and the corresponding public keys KpuUser, these items being stored in sections or fields 18a, 18b, and 18c, respectively.

User equipment 12 includes: input interaction means 12a such as a mouse and/or keyboard, handwriting recognition, voice recognition or other input means for obtaining an ID and, if used, a passphrase from a user, and for a user to fill in a document, and for biometric measurement or scanning, if used, to obtain biometric information (fingerprint, voiceprint, retina scan, face scan) from a user; a hashing means for applying a secure hash function (SHA-1 or RIPEMD) to an entered passphrase or obtained biometric information, and to an approved document; a symmetric decryption means 12c for decrypting an encrypted private key received from server 16 using the hashed passphrase or biometric information as a user identifying key; and an El-Gamal algorithm means 12d for performing encryption, decryption, signature and verification operations in accordance with the El-Gamal algorithm, the encryption and signing operations requiring secret fresh random numbers. In particular, as will become clearer as the discussion proceeds, El-Gamal algorithm means performs decryption, verification, and signature operations in conjunction with a challenge response protocol assuring to the user equipment 12 that a random number R1 supplied to from server 16 is both secret and fresh, and assuring to the server that the user is in possession of the private key (i.e. was able to decrypt the private key because the correct user identifying information has been obtained by user equipment 12). Thereafter, a document is sent for approval, possibly after modification or filling in, a hash of the approved document is signed using the private key of the user and this secret fresh random number R1 to form a digital signature S[KprUser, R1](H(DOC)) of a document. The various hashing, symmetrical decryption, and El-Gamal algorithm means 12b, 12c, 12d may be implemented by software running on a CPU (not shown) of user equipment 12 or by special purpose hardware. Where the system 10 is implemented as an intranet, this functionality would be carried out by an applet supplied by server 16. It should be understood that in order to prevent a man-in-the-middle attack, the applet must be signed by the server and verified at user equipment 12 using the public key of the server KpuServer obtained with a certificate from a trusted authority.

Server 16 comprises: means 16a for reading from and writing to the store 18; random number generator means 16b for generating random numbers; hashing means 16c for performing a secure hash function to hash together random numbers and other items in conjunction with the challenge response protocol, and for forming a hash of a received approved document H(DOC); El-Gamal algorithm means 16d for performing encryption, decryption, signature, and verification operations employing the El-Gamal algorithm, the encryption and signing operations requiring secret fresh random numbers; and a freshness value generating means 16e for constructing a freshness value FR indicating a date/time assigned to items or a package being transmitted by server 16. Random number generator 16b is preferably a natural random source which reads or measures a natural random phenomenon, e.g. shot noise in the current of a reverse biased zener diode. Hashing means 16c, El-Gamal algorithm means 16d, and freshness value generating means 16e may be implemented by software running on a CPU (not shown) of server 16, or by specialized hardware.

Figure 2:
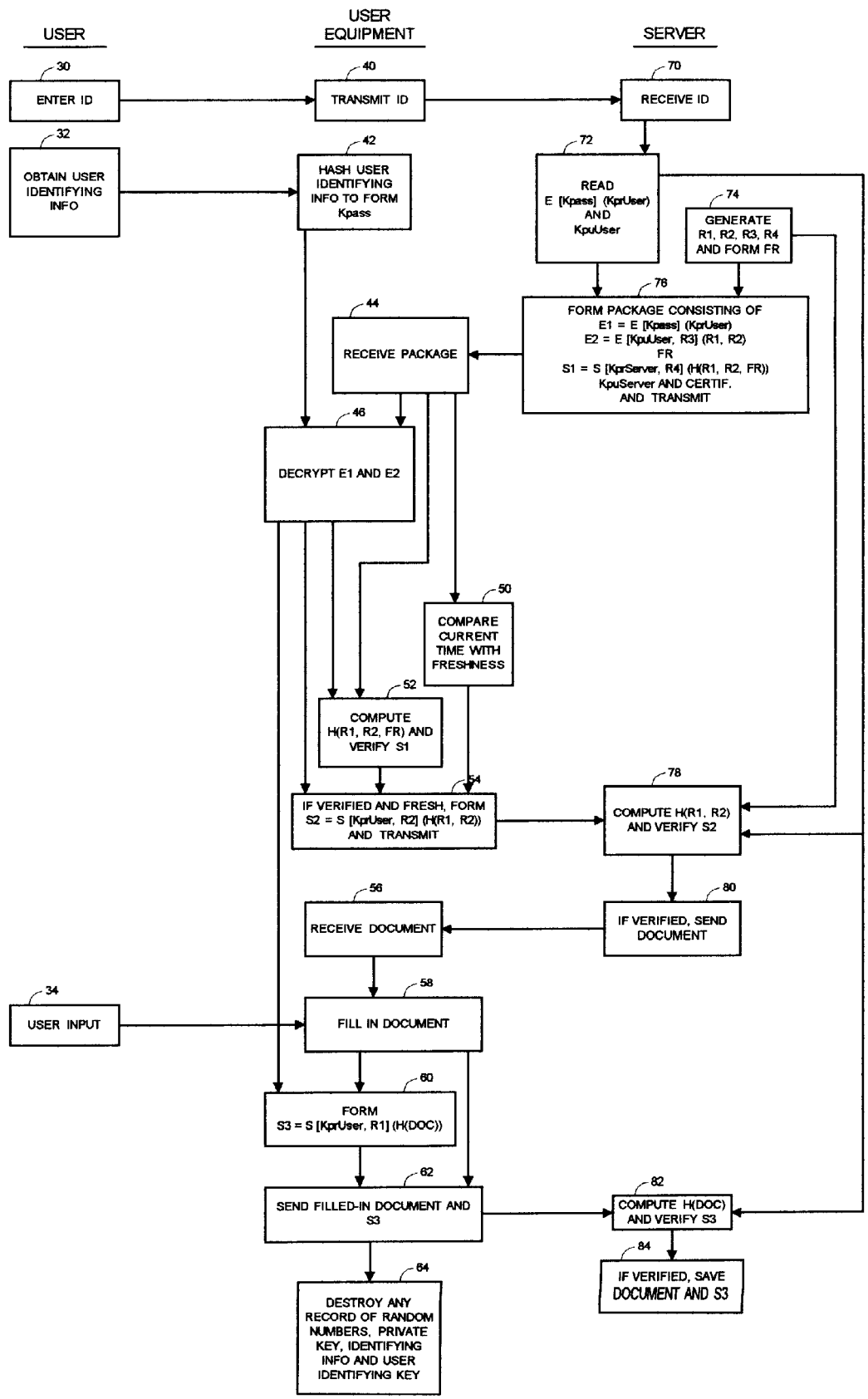
FIG. 2 is a data flow chart which indicates in separate columns the method steps performed by the user, the user equipment, and the server in operation of the system of FIG. 2.

The operation of the networked system 10 in providing a secret fresh random number R1 and encrypted private key KprUser to the user in the course of a phase in the nature of a challenge response protocol, which after completion of this phase, are used for a digital signature employing the El-Gamal algorithm of a document S[KprUser, R1](H(DOC)) which is derived from, or the same as, a then supplied document, will be best understood by also referring to FIG. 2. This Figure shows the operations performed by user interaction, by the user equipment 12, and by the server 16 in different columns. For the purposes of this Figure, it is assumed that the user has already requested access to the document system (home page) and the server 16 has sent a sign-in page to the user equipment 12. Thereafter at step 30, the user enters his ID in the sign-in page via input means 12a, e.g. the initials of the user, providing the IDs of all users are unique, and at step 40 the sign-in page including the entered ID is transmitted to the server, which receives it at step 70. In response, at step 72 the server 16, using the received ID as an index, reads from store 18 the corresponding encrypted private key E[Kpass}(KprUser) and public key KpuUser of the user. Also at step 74, random number generator 16b generates four random numbers R1, R2, R3, and R4 and freshness value generating means 16e forms a freshness value FR representing the current date/time by checking the clock (not shown) of server 16.

The items obtained in steps 72, and 74 are used in step 76 using hashing means 16c and El-Gamal algorithm means 16d to form a package of items which is then transmitted to user equipment 12 via network 14. The package consists of:

a) a first encrypted component E1 read in step 72 which as aforementioned has previously been formed by encrypting the private key of the user KprUser using the user's identifying key Kpass:
E1=E[Kpass](KprUser);

b) a second encrypted component E2 which is formed by the server encrypting together random numbers R1 and R2 employing the El-Gamal algorithm using the public key of the user KpuUser and the third random number, thereby forming:
E2=E[KpuUser, R3](R1, R2);

c) freshness value FR; and d) a first signature S1 of a hashing together of the first and second random numbers R1, R2, and the freshness value FR, which signature employs the El-Gamal algorithm using the private key of the server KprServer and the fourth random number R4, thereby forming:
S1=S[KprServer, R4](H(R1, R2, FR).

There are a variety of techniques known to persons of ordinary skill in the art to encrypt together multiple items or to hash together multiple items. A sufficient method in each case is to concatenate the multiple items prior to the encrypting or hashing operations.

The package may also contain the public key of the server KpuServer and certificate pertaining thereto from a trustworthy authority needed by user equipment 12.

At user equipment 12, the package is received at step 44, and prior to after step 44, the user identifying information is obtained at step 32 by user interaction means obtaining an entered passphrase or scanning or measuring biometric information (fingerprint, voiceprint, retina scan, or face scan) with respect to the user physically present at user equipment 12, and at step 42, employing hashing means 12b to apply the same secure hash function (SHA-1 or RIPEMD) to the user identifying information as was applied by hashing means 20b of secure equipment 20, to thereby obtain the same user identifying key Kpass as was utilized in producing the received encrypted private key E[Kpass](KprUser).

In step 46, symmetric decryption means 12c is employed using the obtained user identifying key Kpass to decrypt the received first encrypted component E1 to obtain the private key KprUser of the user, which operation is represented as follows:

D[Kpass](E[Kpass](KprUser))=KprUser, and the El-Gamal algorithm means 12d is employed using the thereby obtained private key KprUser to decrypt the received second encrypted component E2 to obtain the first and second random numbers R1 and R2. The latter operation is represented as follows:

D[KprUser](E[KpuUser, R3](R1, R2))=R1, R2.

Further, at step 50, the current date/time of the user equipment clock (not shown) is read and compared with the received freshness value FR. If the current date/time is not later than the freshness value by more than a predetermined amount, determined from a maximum permitted delay between freshness value generation in step 74 and freshness value checking in step 50, the received package is considered fresh. For the purposes of the freshness test it must be assured that the clocks on the server 16 and user equipment 12 are closely aligned, and the time to perform an entire challenge response protocol exceeds the maximum permitted delay. Also, at step 52 hashing means 12b are utilized to hash together random numbers R1 and R2, and the freshness value FR, and this hash together with the public key of the server KpuServer are used in a verification operation by El-Gamal algorithm means 12d of the received first signature S1. The verification operation may be represented as:

V[KpuServer, H(R1, R2, FR), S1]=pass or fail.

If the aforementioned verification and freshness tests are passed, in step 54 a second signature S2 is formed utilizing hashing means 12b and El-Gamal algorithm means 12d, which second signature S2 is transmitted to server 16 via network 14. In this step, the El-Gamal algorithm is employed using the private key of the user KprUser and the second random number R2 to sign a hashing together of the first and second random numbers R1, R2. The resultant second signature S2 is represented as follows:

S[KprUser, R2](H(R1, R2)).

At the server, this second signature S2 is verified at step 78 by first using hashing means 16c to independently compute a hashing together of random numbers R1, R2 and then using this hash and the read public key of the user KpuUser in a verification operation of El-Gamal algorithm means 16d. This second verification operation, which completes the challenge response protocol by enabling the server to authenticate the user, is represented as follows:

V[KpuUser, H(R1, R2), S2]=pass or fail

In the combined random number passing and challenge response protocol of the present invention, the random numbers R1, R2 have been encrypted by the server to prevent an attacker from getting the numbers and discovering the user's private key KprUser from a signature or encryption by the user using the private key. The freshness value has been sent to assure the freshness of the encrypted random numbers. These random numbers R1, R2 and the freshness value FR have been signed by the server (in forming the first signature S1) to prove that:

a) the random numbers are from the server, otherwise an attacker could send random numbers to the user equipment, and because he already knows them, could discover the user's private key from a signature or encryption by the user using the private key; and b) the freshness value corresponds to these random numbers, otherwise an attacker could get an old signed set of random numbers and attach a new freshness value to them.

If the verification test in step 78 is passed, in step 80 a document to be filled out (or merely approved without modification) by the user is read from store 18d and sent to user equipment 12 via network 14, where it is received at step 56. If the document is accompanied by or forms part of a further applet, as previously mentioned, the applet should be signed by the server 16 and verified at user equipment 12 employing the public key of the server KpuServer.

The completion, signature and verification of the document proceeds in an essentially conventional manner. Through user input at step 34 via user interaction means 12a, the document is filled in, or merely reviewed, and the user's approval of the completed or merely reviewed document DOC is indicated. To manifest this completion and/or approval, in step 80 a third digital signature S3 is formed by using hashing means 12b to produce a hash of the approved document DOC and applying the signature operation of El-Gamal algorithm means 12d thereto using the private key of the user KprUser and the first random number, to form a third signature which is represented as follows:

S[KprUser, R1](H(DOC)).

The third signature S3 and the approved document DOC are at step 62 sent to the server 16, where hashing means 16c are employed to independently compute a hash of the received approved document DOC, and the El-Gamal algorithm means is employed to perform a verification operation using this hash H(DOC) and the public key of the user KpuUser. The verification operation is represented as follows:

V[KpuUser, H(DOC), S3]=pass or fail.

If the verification operation is passed, in step 84, the approved document DOC and the signature S3 are saved in sections 18d, 18e, respectively, of store 18.

Lastly, at user equipment 12, in step 64 in order to frustrate an attacker attempting to compromise the system, any record of the decrypted random numbers R1, R2, the decrypted private key KprUser, the entered passphrase or obtained biometric information, or the user identifying key Kpass formed therefrom, are all erased or destroyed (or, alternatively, a non-volatile record is never made) so they cannot be obtained from the user equipment.

An interesting extension of the system described thus far is possible where the user will need multiple random numbers to sign multiple documents. This extension comes from the recognition that because the data encrypted in the package can have a length of just less than the length of the prime number P, allowing some room for padding, actually at little computational cost further random numbers in addition to R1 and R2 may be encrypted together and signed together with freshness FR in the package formed in step 76. For example, given P having a length of 1024 bits, and the random numbers having a length of 128 bits, five further random numbers R5, R6, R7, R8, and R9 could be so sent at the same time. This would involve that nine random numbers be generated at step 74 and that the second encrypted component E2 in the package formed in step 76, would instead be:

E2=E[KpuUser, R3](R1, R2, R5, R6, R7, R8, R9). These seven encrypted random numbers R1–R2, and R5–R9 would be decrypted by the user equipment at step 46, and with the use of random number R2 to form the second signature S2, six random numbers R1 and R5–R9 would be available for signatures of documents.

Further, the signature S1 in the package formed and sent by the server at step 76 could be a hashing together of the freshness and the aforementioned seven random numbers, but it would be sufficient to sign a hashing together of the freshness FR and at least two of these random numbers. Similarly, a sufficient signature S2 formed and sent by the user equipment 12 in step 54 would be of a hash of at least two of the random numbers received.

Where more than six random numbers are needed for digital signatures, it is also possible to generate further additional random numbers in step 74 and include them in one or more further encrypted components in the package formed and sent by the server in step 76.

It should now be appreciated that the objects of the present invention have been satisfied and that the present invention provides a secure protocol for distributing random numbers and private keys for digital signatures in a networked environment such as an intranet system which can only be compromised by a passphrase or biometric information guessing attack, which is fairly hard, or by failure of the El-Gamal algorithm.

While the present invention has been described in particular detail, it should also be appreciated that numerous modifications are possible within the intended spirit and scope of the invention. For example, the present invention is equally applicable to systems where IDs do not have to be entered by users because they may be retained at user equipment.

What is claimed is:

1. A method of administration of secret fresh random numbers for use by users in a networked environment to which a server is coupled, there being associated with each user a unique respective set including an ID, a private key, and a public key corresponding to the private key, and with the server a private key and a public key, said method comprising, at the server:

receiving via the network a user's ID;

generating at least a first random number;

forming an encrypted component using the public key of the user, said encrypted component containing at least the first random number in encrypted form;

forming a freshness value corresponding to a current date/time;

hashing together items including the first random number and the freshness value to form a first hash;

forming a first signature of the first hash using the private key of the server;

sending to the user via the network a package including at least the encrypted component, freshness value, and first signature;

receiving a second signature of a second hash which has been formed by signing data from said package, derived at least from the first random number, said second signature being formed using the private key of the user; and first verifying, using the public key of the user, whether the second signature is for the same first random number as was sent by the server.

2. The method as claimed in claim 1, wherein: in addition to said first random number, at least second, third, and fourth random numbers are generated;

at least the first and second random numbers are encrypted using the public key of the user and the third random number;

said first hash is formed by hashing together at least said first random number, another random number contained in the package in encrypted form, and said freshness value;

said first signature of the first hash is formed using the private key of the server and the fourth random number;

said data is formed by hashing together the first and at least another random number contained in said package in encrypted form to produce a second hash;

said second signature of the second hash has been formed using the private key of the user and the second random number.

3. The method as claimed in claim 1, further comprising reading from a storage means data corresponding to the user having the received ID, which data comprises the user's private key encrypted using a key determined from identifying information of the user, and said package further includes the encrypted private key of the user.

4. The method of claim 1, further comprising reading from a storage means data corresponding to the user having the received ID, which data comprises the user's private key encrypted using a key determined from identifying information of the user, and said package further includes the encrypted private key of the user.

5. The method as claimed in claim 3, wherein the user identifying information comprises a passphrase entered by the user at the user equipment, or biometric information which is obtained from the user by suitable measurement or scanning at the user equipment.

6. The method as claimed in claim 4, wherein the user identifying information comprises a passphrase entered by the user at the user equipment, or biometric information which is obtained from the user by suitable measurement or scanning at the user equipment.

7. The method as claimed in claim 4, further comprising receiving a third signature of a third hash of a document, which third signature has been formed using the private key of the user and the first random number, and second verifying the third signature using the public key of the user and an independently computed hash of the document.

8. The method as claimed in claim 6, further comprising receiving a third signature of a third hash of a document, which third signature has been formed using the private key of the user and the first random number, and second verifying the third signature using the public key of the user and an independently computed hash of the document.

9. A method for obtaining and using secret fresh random numbers at user equipment in a networked environment to which a server is coupled, there being associated with each user a unique respective set including an ID, a private key, and a public key corresponding to the private key, and with the server a private key and a public key, said method comprising, at the user equipment:

transmitting an ID of a user;

receiving a package including an encrypted component containing at least a first random number in encrypted form, which encrypted component has been produced using the private key of the user, a freshness value corresponding to a date/time, and a first signature of a first hash, said first hash having been formed by hashing together items including said first random number and the freshness value, and said first signature having been formed using the private key of the server;

decrypting the at least first random number using the public key of the user;

determining whether the current date/time is no more than a predetermined amount later than the freshness value;

independently computing the first hash;

verifying the first signature using the public key of the server and the independently computed first hash; and if the results of the determining and verifying are positive:
forming a second signature of data from said package, derived from at least the first random number using the private key of the user; and sending the second signature via the network.

10. The method as claimed in claim 9, wherein:

said encrypted component contains at least first and second random numbers which have been encrypted together using the public key of the user and a third random number;

said first hash has been formed by hashing together at least said first random number, another random number contained in said package, and said freshness value;

said first signature of the first hash has been formed using the private key of the server and a fourth random number;

at least said first and second random numbers are decrypted from the encrypted component using the private key of the user;

said data is formed by hashing together at least two of the random numbers contained in said package in encrypted form to produce a second hash;

said second signature of the second hash is formed using the private key of the user and the second random number.

11. The method as claimed in claim 9, wherein said package further includes the private key of the user encrypted with a user identifying key associated with the user, and said method further comprises decrypting the encrypted private key using a user identifying key determined from interaction with the user at the user equipment.

12. The method as claimed in claim 10, wherein said package further includes the private key of the user encrypted with a user identifying key associated with the user, and said method further comprises decrypting the encrypted private key using a user identifying key determined from interaction with the user at the user equipment.

13. The method as claimed in claim 11, wherein the user identifying key determined by interaction with the user at the user equipment is determined from a passphrase entered by the user at the user equipment or biometric information which is obtained from the user by suitable measurement or scanning at the user equipment.

14. The method as claimed in claim 12, wherein the user identifying key determined by interaction with the user at the user equipment is determined from a passphrase entered by the user at the user equipment or biometric information which is obtained from the user by suitable measurement or scanning at the user equipment.

15. The method as claimed in claim 12, further comprising:

computing a third hash of a document;

forming a third signature of the third hash using the user's private key and the first random number; and transmitting the third signature.

16. The method as claimed in claim 14, further comprising:

computing a third hash of a document;

forming a third signature of the third hash using the user's private key and the first random number; and transmitting the third signature.

17. A server system for supplying items for a plurality of users for use in signature or encryption operations employing the El-Gamal algorithm, there being associated with each user a unique respective set including a private key, and a public key corresponding to the private key, and with the server a private key and a public key, said system comprising:

a random number generator for generating at least first, second, third, and fourth random numbers; and means for forming a package including an encrypted component containing at least the first and second random numbers encrypted together using the public key of a user and the third random number; a freshness value; and a first signature of a first hash formed by hashing together said first random number, at least another random number contained in said package in encrypted form, and said freshness value, said first signature being formed using the private key of the server and the fourth random number.

18. The system as claimed in claim 17, further comprising verification means for verifying received second and third signatures, said second signature being of a second hash which has been formed by hashing together the first and at least another random number contained in said package, and having been made using the private key of the user and the second random number, and said third signature being of a hash of a document, and having been made using the private key of the user and the first random number.

19. The system as claimed in claim 18, further comprising computer readable storage means characterized in that there is stored therein encrypted private keys for the respective users which private keys have been encrypted using respective keys determined from respective user identifying information, and wherein said package further includes the encrypted private key of the user.

20. The system of claim 19, wherein the user identifying information comprises a passphrase or biometric information.

* * * * *